United States Patent
Ely

(10) Patent No.: US 11,348,310 B2
(45) Date of Patent: May 31, 2022

(54) BUILDING MASK GENERATION FROM 3D POINT SET

(71) Applicant: Raytheon Company, Waltham, MA (US)

(72) Inventor: Richard W. Ely, Lewisville, TX (US)

(73) Assignee: Raytheon Company, Waltham, MA (US)

(*) Notice: Subject to any disclaimer, the term of this patent is extended or adjusted under 35 U.S.C. 154(b) by 385 days.

(21) Appl. No.: 16/683,068

(22) Filed: Nov. 13, 2019

(65) Prior Publication Data
US 2021/0142558 A1    May 13, 2021

(51) Int. Cl.
| | |
|---|---|
| *G06T 17/05* | (2011.01) |
| *G06T 17/20* | (2006.01) |
| *G06T 7/593* | (2017.01) |
| *G06T 7/45* | (2017.01) |

(52) U.S. Cl.
CPC .............. *G06T 17/05* (2013.01); *G06T 17/20* (2013.01); *G06T 7/45* (2017.01); *G06T 7/593* (2017.01)

(58) Field of Classification Search
CPC ........... G06T 17/05; G06T 17/20; G06T 7/45; G06T 7/593; G06T 2210/56; G06T 7/136; G06T 7/187; G06T 2200/04; G06T 2207/10028; G06T 2207/30184; G06T 7/11

See application file for complete search history.

(56) References Cited

U.S. PATENT DOCUMENTS

2008/0298638 A1* 12/2008 Miyazaki ........... G06K 9/00637
                                                              382/106
2017/0083763 A1* 3/2017 Zang ......................... G06T 7/73

* cited by examiner

*Primary Examiner* — Christopher M Brandt
(74) *Attorney, Agent, or Firm* — Schwegman Lundberg & Woessner, P.A.

(57) ABSTRACT

Discussed herein are devices, systems, and methods for building mask generation. A method can include setting a respective pixel value of an image to a first specified value if the respective pixel corresponds, according to a three-dimensional (3D) point set, to an elevation greater than a specified Z threshold, otherwise setting the respective pixel value to a second, different specified value, grouping contiguous pixels set to the first specified value into one or more groups, determining a feature of each of the one or more groups, comparing the determined feature to a threshold and retaining the group if the feature is greater than a threshold, otherwise removing the group, and providing a building mask that includes pixels of the retained group set to a value and other pixels set to a different value.

20 Claims, 7 Drawing Sheets

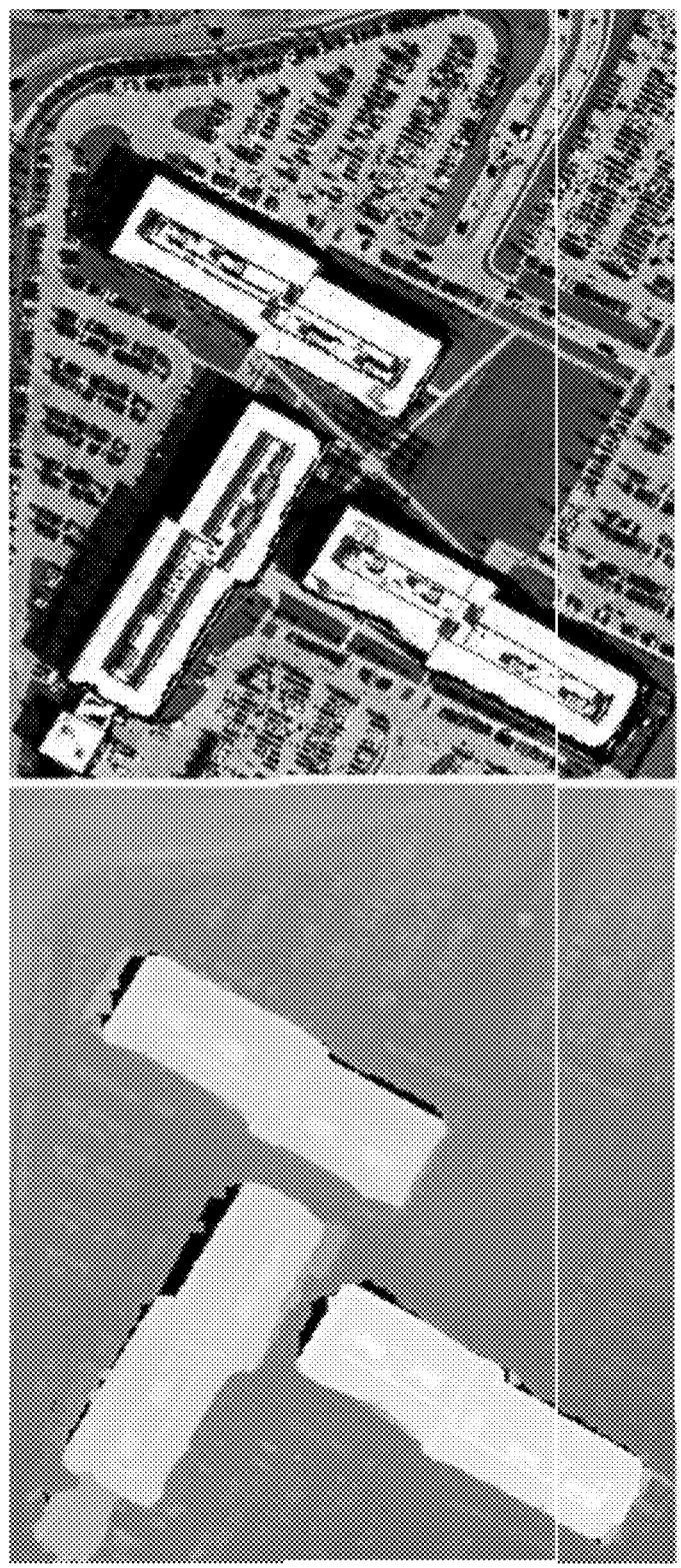
FIG. 3 Z-ORTHO IMAGE
FIG. 4 INTENSITY IMAGE

VOID MASK ORTHO IMAGE

VEGETATION INDEX ORTHO IMAGE

BUILDING MASK GENERATION FROM 3D POINT SET

GOVERNMENT RIGHTS

This invention was made with government support under government contract 18-C-0224. The U.S. Government has certain rights in this invention.

TECHNICAL FIELD

Embodiments discussed herein regard devices, systems, and methods for identifying pixels that correspond to a building in a three-dimensional (3D) point set.

BRIEF DESCRIPTION OF THE DRAWINGS

FIG. 3 illustrates, by way of example a picture of an embodiment of an ortho-rectified view of the 3D point set of FIG. 2.

FIG. 4 illustrates, by way of example, a picture of an embodiment of an ortho-rectified view of an intensity image of a same geographical region as the 3D point set.

DETAILED DESCRIPTION

Discussed herein are methods, devices, systems, and machine-readable media for identifying points corresponding to a building in a 3D point set. Embodiments provide the capability to locate and outline buildings using a 3D point set. Points in the 3D point set can be attributed with an intensity (e.g., a panchromatic intensity, such as a median panchromatic intensity) or one or more electromagnetic spectrum intensities, such as one or more multi-spectral image (MSI) intensities. Embodiments can produce a 3D building mask. The 3D building mask can be used to generate a bare earth digital elevation model (DEMs), for enhanced change detection, or many other applications.

Figure 1:
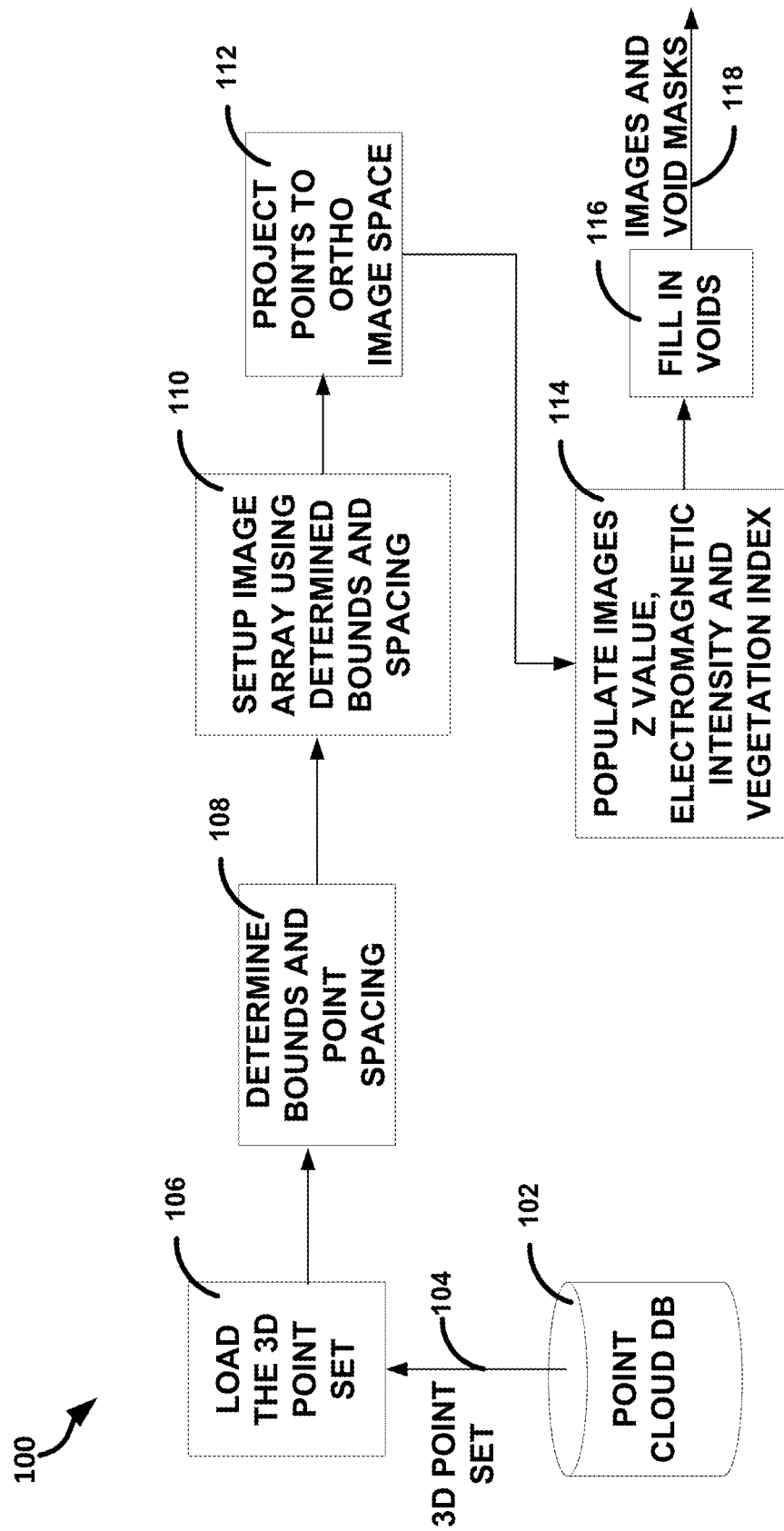
FIG. 1 illustrates, by way of example, a flow diagram of an embodiment of a method for generating one or more images to be used in generating a building mask.

FIG. 1 illustrates, by way of example, a flow diagram of an embodiment of a method 100 for generating one or more images to be used in generating a building mask. The method 100 as illustrated includes loading a 3D point set 104 of a specified geographic region, at operation 106. The 3D point set 104 can be from a point cloud database (DB) 102 that includes 3D points (latitude, longitude, and elevation) or the like that identifies a point on a surface and corresponding relative elevation of that point (relative to other points, a sea level, or the like).

The point cloud DB 102 can include one or more intensities (electromagnetic intensities) associated with each point in the point cloud DB 102. The point cloud DB 102 can include a vegetation index associated with each point in the point cloud DB 102. The intensities and the vegetation index can be used later in the method, such as at operation 112.

An operation 108 can include establishing a scale (sometimes called "point spacing") of the loaded 3D point set 104 and its geographical extent (sometimes called "bounds"). The scale can be computed as a point spacing of the 3D point set 104. The geographical extent can be determined by identifying a minimum X, maximum X, minimum Y, maximum Y of the points in the 3D point set 104. The Y value and X value can correspond to latitude and longitude, respectively, distance in a first direction and distance in a second direction perpendicular to the first direction, respectively, or the like.

At operation 110, an image array can be setup using the determined bounds and point spacing from operation 108. The image array 110 can include an entry for each of the determined bounds and all points therebetween. Each of the points in the image arrays can be separated from each other by the point spacing.

At operation 112, the image array can be adjusted to project the points of the 3D point set 104 to an ortho-rectified space. In the ortho-rectified space, an image appears without image perspective (tilt) and relief (terrain) effects. The image in ortho space can be a planimetrically correct image. In ortho space, the image has a constant scale, thus allowing for direct measurement of distances, angles, areas (sometimes called mensuration), or the like.

Tilt displacement is a shift in an image position of an object on a tilted photo from its theoretical position on a truly vertical photo. This results from the photo plane being tilted with respect to the data plane at the time of exposure. Relief displacement is the shift in an image position of an object caused by its elevation above a specified elevation. For vertical or near vertical photography the shift can occur radially from a nadir point.

At operation 114, multiple instances of the image array can be populated. For example, a first instance of the image array can be populated with Z values from the point cloud DB 102 projected to ortho space; a second instance of the image array can be populated with electromagnetic intensity values from the point cloud DB 102 projected to ortho space; and a third instance of the image array can be populated with vegetation index values from the point cloud DB 102 projected to ortho space.

At operation 116, voids in the populated image arrays (sometimes called images) can be filled in. Any suitable technique for filling in voids can be used. For example, linear interpolation, window averaging, or the like, can be used to fill in voids. A void mask for each of the populated images can be generated. The void mask is a black and white image that indicates pixels (entries in the image arrays) for which there is no known value (e.g., vegetation index value, electromagnetic intensity value, Z value, of the like). The populated image arrays and corresponding void masks can be provided as the images and void masks 118.

Figure 2:
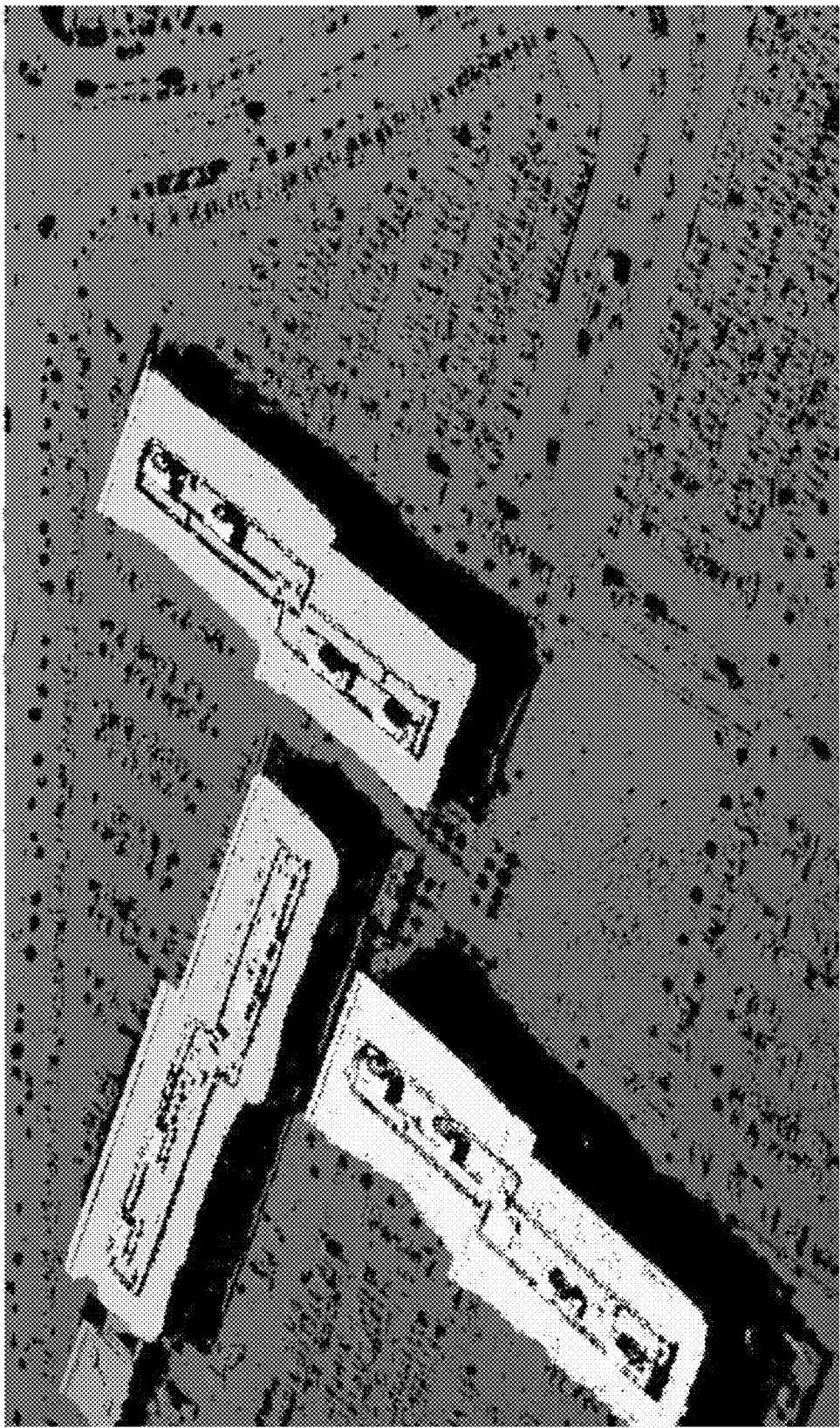
FIG. 2 illustrates, by way of example, a picture of an embodiment of a 3D point set colored by elevation value.

FIG. 2 illustrates, by way of example, a picture of an embodiment of a 3D point set, such as the 3D point set 104, colored by elevation value. The picture of FIG. 2 includes tilt and terrain.

FIG. 3 illustrates, by way of example a picture of an embodiment of an ortho-rectified view of the 3D point set of FIG. 2. FIG. 3 can be produced by performing the operations of FIG. 1 on the 3D data of the 3D point set 104 of FIG. 2.

FIG. 4 illustrates, by way of example, a picture of an embodiment of an ortho-rectified view of an intensity image of a same geographical region as the 3D point set 104. The image of FIG. 4 can be produced by performing the operations of FIG. 1 and populating the image array with corresponding intensity data.

Figure 5:
FIG. 5 illustrates, by way of example, a picture of an embodiment of an ortho-rectified view of a vegetation index image of a same geographical region as the 3D point set.

FIG. 5 illustrates, by way of example, a picture of an embodiment of an ortho-rectified view of a vegetation index image of a same geographical region as the 3D point set 104. The image of FIG. 4 can be produced by performing the operations of FIG. 1 and populating the image array with corresponding vegetation index values. A vegetation index is a spectral transformation of two or more spectral bands designed to indicate contribution of vegetation properties to a geographic region. Examples of vegetation indices include simple ratio, normalized difference vegetation index (NDVI), infrared index, perpendicular vegetation index, greenness above bare soil, midinfrared index, soil-adjusted vegetation index (SAVI), enhanced vegetation index, and new vegetation index, among others.

Figure 6:
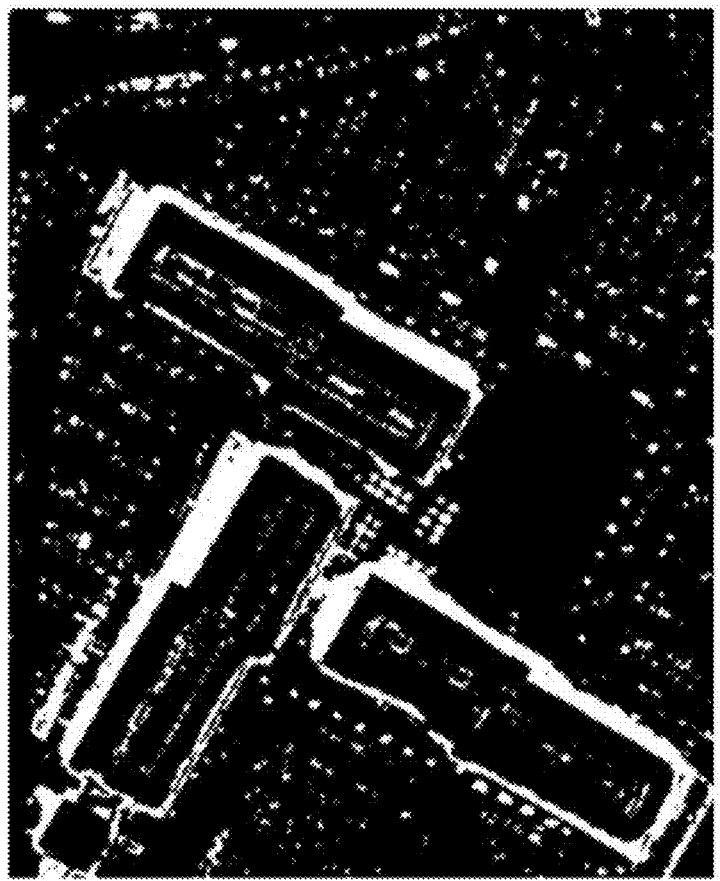
FIG. 6 illustrates, by way of example, a picture of an embodiment of an ortho-rectified view of a void mask image of a same geographical region as the 3D point set.

FIG. 6 illustrates, by way of example, a picture of an embodiment of an ortho-rectified view of a void mask image of a same geographical region as the 3D point set 104. The image of FIG. 6 can be produced by performing the operations of FIG. 1 and populating the image array with corresponding values that indicate whether there is a 3D point in the 3D point set 104 for the pixel or there is not a 3D point in the 3D point set 104 for the pixel. In the image shown in FIG. 6, light (white) regions correspond to voids.

Figure 7:
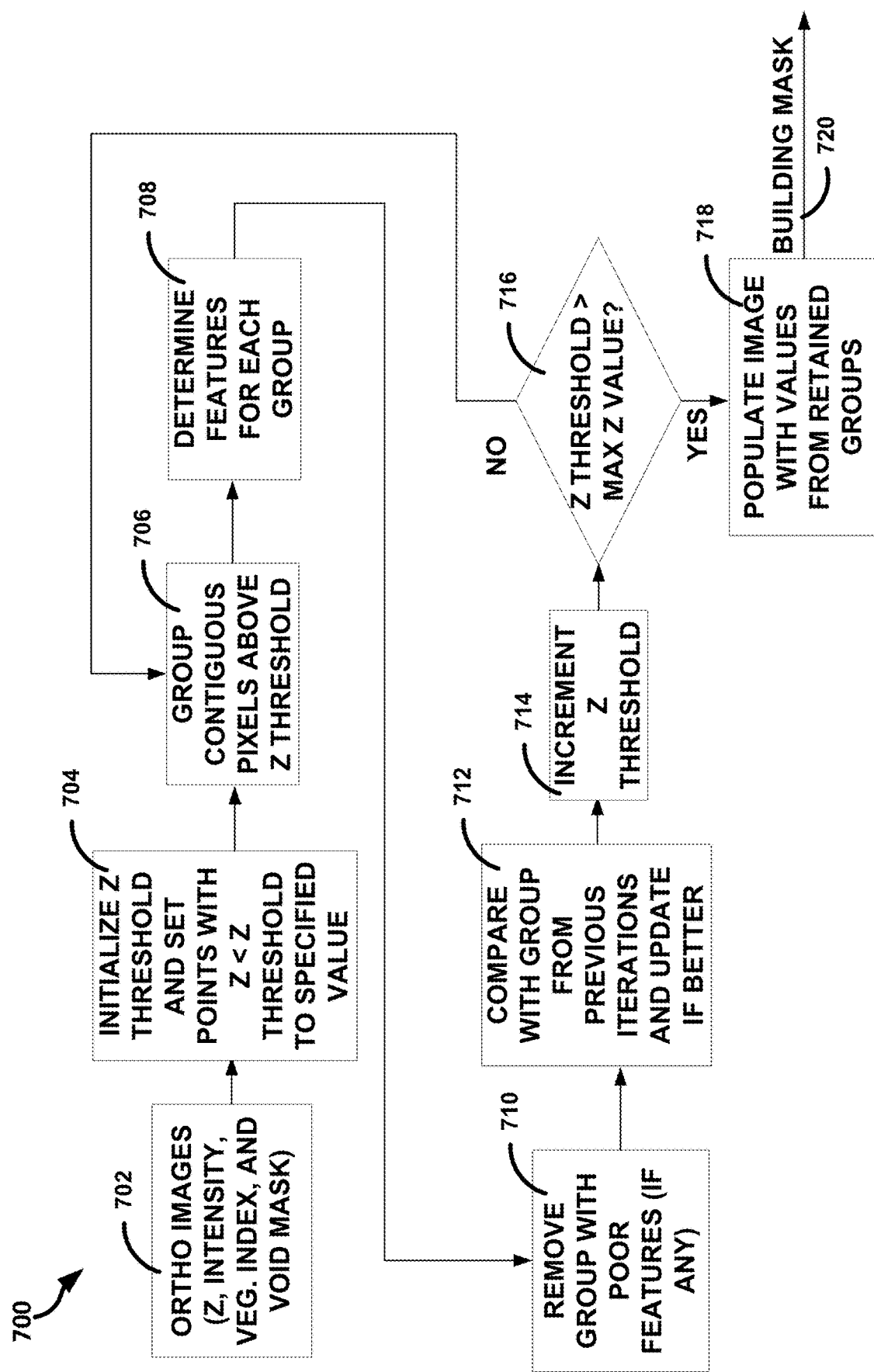
FIG. 7 illustrates, by way of example, a flow diagram of an embodiment of a method for generating a building mask.

A method 700 of generating the building mask, as shown in FIG. 7, uses a series of Z thresholds to create Z planes from which building roof candidates can be extracted. The method 700 is akin to incrementally flooding the scene with water until only a building roof of a building is visible (from nadir). Given hilly terrain and varying building heights, the roofs will likely become inundated at different Z levels. The method 700 tries finds the best Z threshold for each building roof and return contiguous pixels above the Z threshold as the building roof.

FIG. 7 illustrates, by way of example, a flow diagram of an embodiment of a method 700 for generating a building mask 720. The method 700 can use a series of Z thresholds to create Z planes from which building roof candidates ("groups" of contiguous pixels above a Z threshold) can be extracted.

The building mask 720 can be generated based on one or more of the ortho-rectified images generated using the method 100. At operation 702, the ortho-rectified images (Z-image, intensity image, vegetation index image, or void mask) can be provided as input. At operation 704, a Z threshold can be initialized. The initial value can be the minimum Z value (according to the 3D point set 104) plus an increment amount (e.g., one foot, half foot, meter, half meter, or a larger or smaller increment amount).

At operation 704, all pixels in a group mask image corresponding to pixels in the Z image that are greater than (or equal to) the Z threshold can be set to a specified value (e.g., a maximum or minimum intensity value for example, such as "0" or "256" or other maximum or minimum intensity value). At operation 704, any pixels in the group mask image not set to the specified value can be set to a different specified value, such as "256" or "0", or other minimum or maximum intensity value.

At operation 706, contiguous pixels in the group mask image greater than (or equal to) the specified Z threshold can be grouped. A group has a corresponding group identifier that uniquely identifies the group and points to pixels in the group. The group will be used as a building in the building mask 720 if one or more features of the group are sufficient (pass operation 710 and are not superseded by another group at operation 712).

In some embodiments, the group can include contiguous pixels above the Z threshold that include a vegetation index value (according to the vegetation index image) less than a specified vegetation index threshold. Removing pixels that have a vegetation index score greater than a threshold value helps retain a roof shape that is not obscured by vegetation.

At operation 708, features for each group can be determined. Features can include roof size (in terms of number of pixels or area coverage on the ground), Z range (a difference between the highest and lowest Z values of the contiguous pixels of the group), average vegetation index (based on the vegetation index image), percentage of non-void pixels (non-void pixels divided by pixels in the group), average Z gradient magnitude (using a Sobel or similar operator), average edge Z difference (an average difference between each edge pixel's Z value and each of its neighbor pixels' Z values that are not in the group (e.g., are below the current Z threshold) is determined, and then all differences are averaged), convexity (a segment is convex if for any two points in a segment, a straight line connecting the points goes only through points of the segment, convexity can thus be a ratio of number of pixels in group divided by a number of pixels in a smallest convex segment containing the group), average Z gradient phase match (as measured on the Z image against all the edge pixels in a group image), the average intensity image edge gradient magnitude, and the average intensity image gradient phase match, and ratio of edge pixels to the size of the group (number of edge pixels/total number of pixels in the group).

Thresholds can be applied to each of these features to eliminate false alarms. Example thresholds for each of these features are provided: roof size (e.g., 100 sq meter to 8000 sq meters, or other roof size threshold), average vegetation index (e.g., less than −0.02, less than 0, less than 0.01, or other average vegetation index threshold)), percentage of non-void pixels (e.g., greater than 35%, 36%, 37%, 38% 39.0%, 40%, a greater or lesser percentage, or a percentage therebetween), average edge Z difference (e.g., greater than 0.5 meters, 0.55 meters, 0.6 meters, 0.64 meters, 0.65 meters, a greater or lesser value or a value therebetween), convexity (e.g., 0.35, 0.37, 0.40, 0.42, 0.45, a greater or lesser convexity threshold, or a threshold therebetween), and ratio of edge pixels to the size of the group (e.g., 0.45, 0.46, 0.47, 0.48, 0.49, 0.50, a greater or less ratio threshold or a ratio threshold therebetween). The threshold values are merely examples and other thresholds values can be used.

Unless the terrain is flat, much of the ground can be above the initial threshold (prior to a first performance of the operation 714) and the building roofs will be in a group with surrounding terrain or objects. Sometimes a group in the first few iterations of operations of the method 700 can be too large to be a building roof, while the groups in the first few iterations of the correct size range usually have poor features and are eliminated in the first few iterations. If some groups pass, they may not be the best representation of the roof because the current Z threshold does not properly show the roof. Any group with sufficient features can be retained along with its features for comparison with the results from future iterations of the Z plane thresholding of the method 700.

At operation 710, groups with poor features can be removed. This includes a group with a specified number of features failing a respective threshold test.

At operation 712, feature values of a current group are compared with the group from a previous iteration (if it exists). At operation 712, a current group replaces the previous group of a superset of pixels if the current group is deemed better according to a metric. If the metric value is greater than a threshold value (e.g., 1.0 or other value), then the new building can be deemed superior and replace the previous building group at that location.

The metric can include determining a product of feature ratios (ratio of a feature of a group from a previous iteration to the same feature of a subset of the group in the current iteration). The metric can be the product of any or all of the features described elsewhere herein. Each feature ratio can be capped so that the ratio does not have an excessive contribution to the total product.

The metric can include multiplying by a size ratio factor which is a root of the ratio of the sizes (number of pixels) of the current group to the previous group. In some embodiments the root can be a square root, third root, fourth root, or other root. Consider an embodiment where there are some structures on a roof (storage shed, air conditioner, or the like that are more than an increment of the Z threshold tall) in the 3D point set 104. The Z-level can be incremented such that the roof is eliminated and the only pixels in the group correspond to things on the roof. Note that the group size ratio factor can help prevent replacement of a retained group by a substantially smaller group. This can happen with structures on the roof of a building. As the Z plane level increases, the main roof is covered and only the structures on top the roof are above the Z threshold. Without the size factor constant, one or more of the structures on the roof may replace the prior group and the larger building group can be lost.

At operation 714, the Z threshold can be incremented. In some embodiments, the increment can be less than a story of a normal building. In some embodiments, the increment can be one third of a meter, a half meter, a meter, two meters, a greater or lesser distance, or some distance therebetween.

At operation 716, it can be determined whether the Z threshold is greater than (or equal to) a maximum Z value. The maximum Z value can be set to a maximum Z value in the Z ortho image. If the Z threshold is greater than (or equal to) the maximum Z value, an operation 718 can be performed. If the Z threshold is not greater than (or equal to) the maximum Z value, the method 700 can proceed with another iteration of the operations 706, 708, 710, 712, 714, and 716.

At operation 718, an image array can be populated based on retained groups to generate a building mask 720. The building mask 720 can include values that indicate whether the pixel corresponds to a building or not based on the method 700. For example, in the building mask 720, a pixel intensity can be set to a maximum or minimum value if the pixel is part of a retained group and can be set to a minimum or maximum value otherwise.

Figure 8:
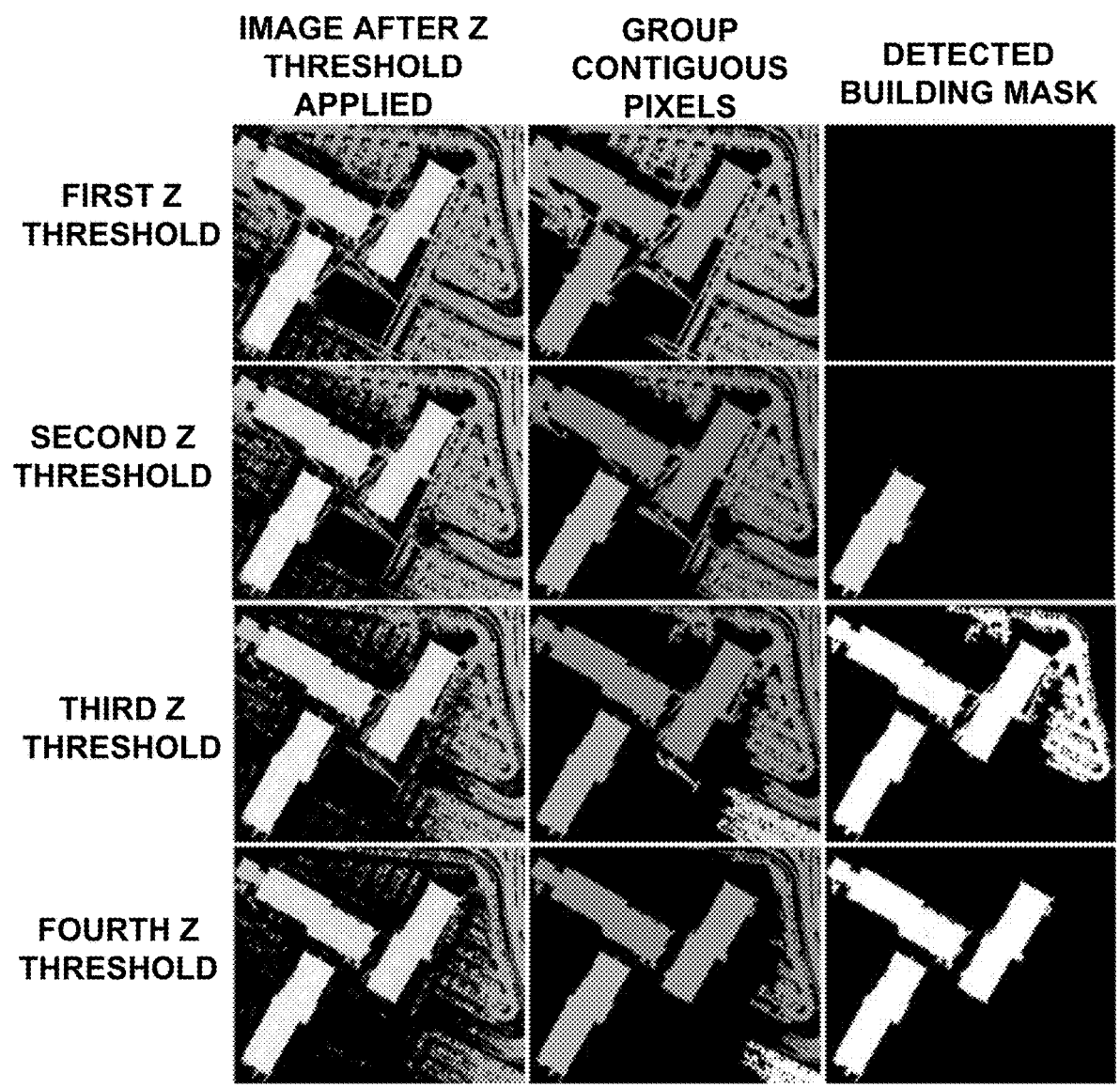
FIG. 8 illustrates, by way of example, a diagram of an embodiment of an image progression through successive iterations of the method of FIG. 7.

FIG. 8 illustrates, by way of example, a diagram of an embodiment of an image progression through successive iterations of the method 700. A first column of images in FIG. 8 illustrates the image after a corresponding Z threshold is applied at operation 704. A second column of images in FIG. 8 illustrates the image in the first column after grouping contiguous pixels above the Z threshold (after operation 706 is performed on the image in the first column). A third column of images in FIG. 8 illustrates the resulting building mask after operations 708, 710, 712, 714, and 716 are performed on the groups and the Z threshold.

The coordinates of the building mask 720 can be converted to real world XYZ coordinates, such as universal transverse mercator (UTM), latitude, longitude, and elevation, or the like. This is possible because the ortho-rectification process (operation 112) preserves the mapping from row, column in the ortho image back to real world coordinates. This is beneficial to indicate the actual position of the buildings in the real world and not in the pixel coordinate system of the ortho image created from the 3D point set 104.

Figure 9:
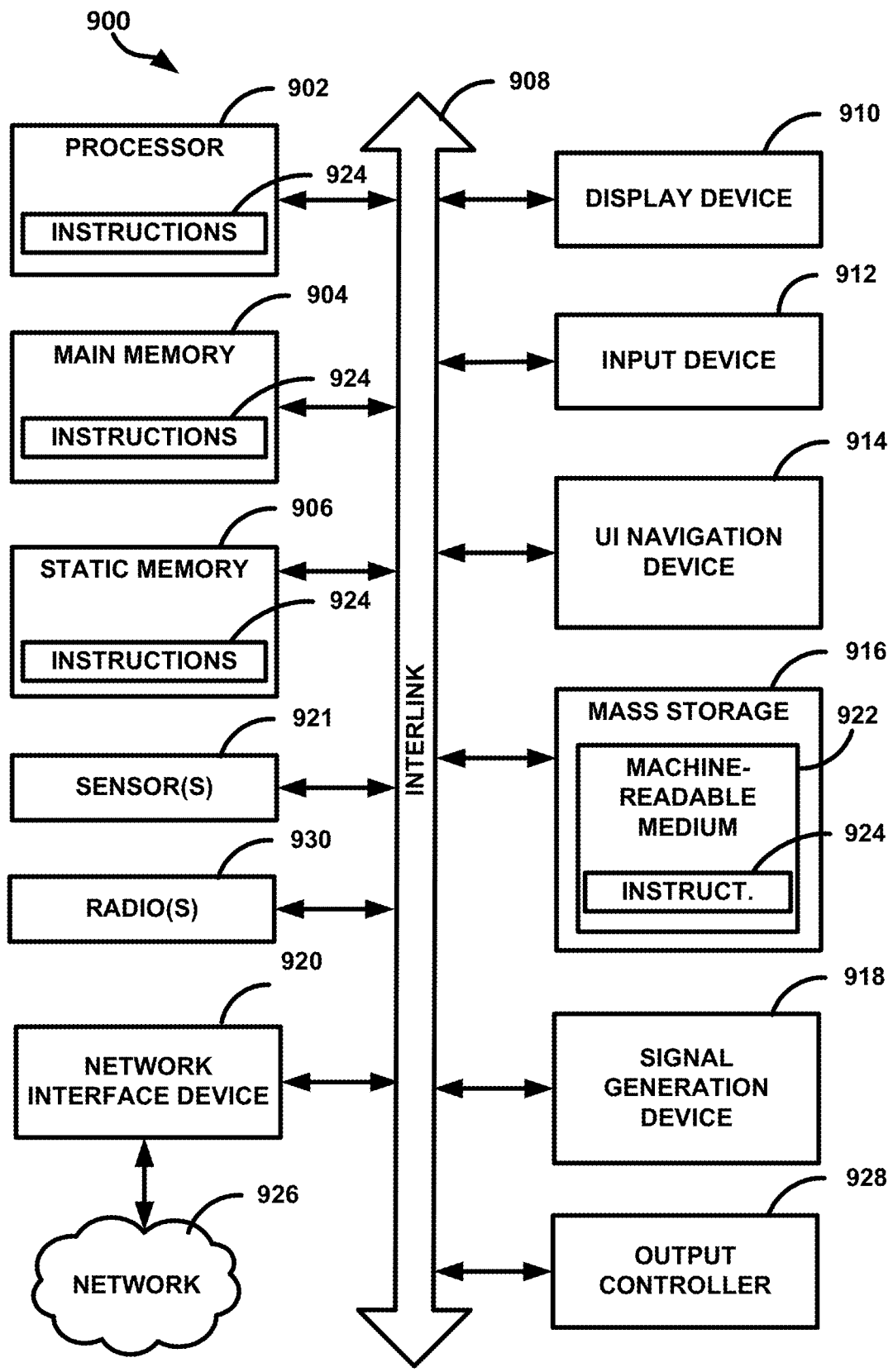
FIG. 9 illustrates, by way of example, a block diagram of an embodiment of a machine in the example form of a computer system within which instructions, for causing the machine to perform any one or more of the methodologies discussed herein, may be executed.

FIG. 9 illustrates, by way of example, a block diagram of an embodiment of a machine in the example form of a computer system 900 within which instructions, for causing the machine to perform any one or more of the methodologies discussed herein, may be executed. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a mass storage unit 916, a signal generation device 918 (e.g., a speaker), a network interface device 920, and a radio 930 such as Bluetooth, WWAN, WLAN, and NFC, permitting the application of security controls on such protocols.

The mass storage unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

ADDITIONAL NOTES AND EXAMPLE EMBODIMENTS

Example 1 includes a method for building mask generation, the method comprising setting a respective pixel value of an image to a first specified value if the respective pixel corresponds, according to a three-dimensional (3D) point set, to an elevation greater than a specified Z threshold, otherwise setting the respective pixel value to a second, different specified value, grouping contiguous pixels set to the first specified value into one or more groups, determining a feature of each of the one or more groups, comparing the determined feature to a threshold and retaining the group if the feature is greater than a threshold, otherwise removing the group, and providing a building mask that includes pixels of the retained group set to a value and other pixels set to a different value.

In Example 2, Example 1 can further include, before providing the building mask retaining a first group of the groups, increasing the specified Z threshold, and setting a respective pixel value of a next image to the first specified value if the respective pixel corresponds, according to the 3D point set, to an elevation greater than the increased specified Z threshold, otherwise setting the respective pixel value to the second, different specified value.

In Example 3, Example 2 can further include grouping contiguous pixels of the next image set to the first specified value into one or more second groups, determining the feature of a second group of the second groups that corresponds to a subset of the retained group, comparing the feature of the second group to the feature of the retained group, determining a metric based on the feature of the second group to the feature of the retained group, and replacing the retained group with the second group if the metric is greater than a specified threshold.

In Example 4, Example 3 further includes, wherein replacing the retained group with the second group if the metric is greater than the specified threshold includes scaling the metric by a ratio of a size of the second group to the size of the retained group and replacing the retained group with the second group if the scaled metric is greater than the specified threshold.

In Example 5, Example 4 further includes, wherein replacing the retained group with the second group if the metric is greater than the specified threshold includes multiplying a ratio of the feature of the second to the feature of the retained by a root of the ratio of the size of the second group to the size of the retained group.

In Example 6, at least one of Examples 1-5 further includes, wherein the feature includes one or more of group size, Z range, average vegetation index, percentage of non-void pixels, average Z gradient, average edge Z difference, convexity, average Z phase match, average intensity image edge gradient, average intensity image phase match, and ratio of edge pixels to the size of the group.

In Example 7, at least one of Examples 1-6 further includes receiving a 3D point set of a geographical region, projecting the 3D point set to an ortho-rectified space of the 3D point set, generating one or more of a Z image, a vegetation index image, an intensity image, and a void mask image in the ortho-rectified space of the 3D point set, and wherein the feature of the group is determined based on the generated image.

Example 8 includes a system for building mask generation, the system comprising a database including three-dimensional (3D) data of geographical regions stored thereon, processing circuitry configured to set a respective pixel value of an image to a first specified value if the respective pixel corresponds, according to a 3D point set of the 3D data, to an elevation greater than a specified Z threshold, otherwise set the respective pixel value to a second, different specified value, group contiguous pixels set to the first specified value into one or more groups, determine a feature of each of the one or more groups, compare the determined feature to a threshold and retaining the group if the feature is greater than a threshold, otherwise remove the group, and provide a building mask that includes pixels of the retained group set to a value and other pixels set to a different value.

In Example 9, Example 8 can further include, wherein the processing circuitry is further configured to, before providing the building mask retain a first group of the groups, increase the specified Z threshold, and set a respective pixel value of a next image to the first specified value if the respective pixel corresponds, according to the 3D point set, to an elevation greater than the increased specified Z threshold, otherwise set the respective pixel value to the second, different specified value.

In Example 10, Example 9 can further include, wherein the processing circuitry is further configured to group contiguous pixels of the next image set to the first specified value into one or more second groups, determine the feature of a second group of the second groups that corresponds to a subset of the retained group, compare the feature of the second group to the feature of the retained group, determine a metric based on the feature of the second group to the feature of the retained group, and replace the retained group with the second group if the metric is greater than a specified threshold.

In Example 11, Example 10 can further include, wherein replacing the retained group with the second group if the metric is greater than the specified threshold includes scaling the metric by a ratio of a size of the second group to the size of the retained group and replacing the retained group with the second group if the scaled metric is greater than the specified threshold.

In Example 12, Example 11 can further include, wherein replacing the retained group with the second group if the metric is greater than the specified threshold includes multiplying a ratio of the feature of the second to the feature of the retained by a root of the ratio of the size of the second group to the size of the retained group.

In Example 13, at least one of Examples 8-11 can further include, wherein the feature includes one or more of group size, Z range, average vegetation index, percentage of non-void pixels, average Z gradient, average edge Z difference, convexity, average Z phase match, average intensity image edge gradient, average intensity image phase match, and ratio of edge pixels to the size of the group.

In Example 14, at least one of Examples 9-13 can further include, wherein the processing circuitry is further configured to receive a 3D point set of a geographical region, project the 3D point set to an ortho-rectified space of the 3D point set, generate one or more of a Z image, a vegetation index image, an intensity image, and a void mask image in the ortho-rectified space of the 3D point set, and wherein the feature of the group is determined based on the generated image.

Example 15 includes at least one non-transitory machine-readable medium including instructions that, when executed by a machine, cause the machine to perform operations for building mask generation, the operations comprising setting a respective pixel value of an image to a first specified value if the respective pixel corresponds, according to a three-dimensional (3D) point set, to an elevation greater than a specified Z threshold, otherwise setting the respective pixel value to a second, different specified value, grouping contiguous pixels set to the first specified value into one or more groups, determining a feature of each of the one or more groups, comparing the determined feature to a threshold and retaining the group if the feature is greater than a threshold, otherwise removing the group, and providing a building mask that includes pixels of the retained group set to a value and other pixels set to a different value.

In Example 16, Example 15 can further include, wherein the operations further comprise, before providing the building mask retaining a first group of the groups, increasing the specified Z threshold, and setting a respective pixel value of a next image to the first specified value if the respective pixel corresponds, according to the 3D point set, to an elevation greater than the increased specified Z threshold, otherwise setting the respective pixel value to the second, different specified value.

In Example 17, Example 16 can further include, wherein the operations further comprise grouping contiguous pixels of the next image set to the first specified value into one or more second groups, determining the feature of a second group of the second groups that corresponds to a subset of the retained group, comparing the feature of the second group to the feature of the retained group, determining a metric based on the feature of the second group to the feature of the retained group, and replacing the retained group with the second group if the metric is greater than a specified threshold.

In Example 18, Example 17 can further include, wherein replacing the retained group with the second group if the metric is greater than the specified threshold includes scaling the metric by a ratio of a size of the second group to the size of the retained group and replacing the retained group with the second group if the scaled metric is greater than the specified threshold.

In Example 19, Example 18 can further include, wherein replacing the retained group with the second group if the metric is greater than the specified threshold includes multiplying a ratio of the feature of the second to the feature of the retained by a root of the ratio of the size of the second group to the size of the retained group.

In Example 20, at least one of Examples 15-19 can further include, wherein the feature includes one or more of group size, Z range, average vegetation index, percentage of non-void pixels, average Z gradient, average edge Z difference, convexity, average Z phase match, average intensity image edge gradient, average intensity image phase match, and ratio of edge pixels to the size of the group.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for building mask generation, the method comprising:
    setting a respective pixel value of an image to a first specified value if the respective pixel corresponds, according to a three-dimensional (3D) point set, to an elevation greater than a specified Z threshold, otherwise setting the respective pixel value to a second, different specified value;
    grouping contiguous pixels set to the first specified value into one or more groups;
    determining a feature of each of the one or more groups;
    comparing the determined feature to a threshold and retaining the group if the feature is greater than a threshold, otherwise removing the group; and
    providing a building mask that includes pixels of the retained group set to a value and other pixels set to a different value.

2. The method of claim 1, further comprising, before providing the building mask:
    retaining a first group of the groups;
    increasing the specified Z threshold; and
    setting a respective pixel value of a next image to the first specified value if the respective pixel corresponds, according to the 3D point set, to an elevation greater than the increased specified Z threshold, otherwise setting the respective pixel value to the second, different specified value.

3. The method of claim 2, further comprising:
    grouping contiguous pixels of the next image set to the first specified value into one or more second groups;
    determining the feature of a second group of the second groups that corresponds to a subset of the retained group;
    comparing the feature of the second group to the feature of the retained group;

determining a metric based on the feature of the second group to the feature of the retained group; and replacing the retained group with the second group if the metric is greater than a specified threshold.

4. The method of claim 3, wherein replacing the retained group with the second group if the metric is greater than the specified threshold includes scaling the metric by a ratio of a size of the second group to the size of the retained group and replacing the retained group with the second group if the scaled metric is greater than the specified threshold.

5. The method of claim 4, wherein replacing the retained group with the second group if the metric is greater than the specified threshold includes multiplying a ratio of the feature of the second to the feature of the retained by a root of the ratio of the size of the second group to the size of the retained group.

6. The method of claim 1, wherein the feature includes one or more of group size, Z range, average vegetation index, percentage of non-void pixels, average Z gradient, average edge Z difference, convexity, average Z phase match, average intensity image edge gradient, average intensity image phase match, and ratio of edge pixels to the size of the group.

7. The method of claim 1, further comprising:
receiving a 3D point set of a geographical region;
projecting the 3D point set to an ortho-rectified space of the 3D point set;
generating one or more of a Z image, a vegetation index image, an intensity image, and a void mask image in the ortho-rectified space of the 3D point set; and
wherein the feature of the group is determined based on the generated image.

8. A system for building mask generation, the system comprising:
a database including three-dimensional (3D) data of geographical regions stored thereon;
processing circuitry configured to:
set a respective pixel value of an image to a first specified value if the respective pixel corresponds, according to a 3D point set of the 3D data, to an elevation greater than a specified Z threshold, otherwise set the respective pixel value to a second, different specified value;
group contiguous pixels set to the first specified value into one or more groups;
determine a feature of each of the one or more groups;
compare the determined feature to a threshold and retaining the group if the feature is greater than a threshold, otherwise remove the group; and
provide a building mask that includes pixels of the retained group set to a value and other pixels set to a different value.

9. The system of claim 8, wherein the processing circuitry is further configured to, before providing the building mask:
retain a first group of the groups;
increase the specified Z threshold; and
set a respective pixel value of a next image to the first specified value if the respective pixel corresponds, according to the 3D point set, to an elevation greater than the increased specified Z threshold, otherwise set the respective pixel value to the second, different specified value.

10. The system of claim 9, wherein the processing circuitry is further configured to:
group contiguous pixels of the next image set to the first specified value into one or more second groups;

determine the feature of a second group of the second groups that corresponds to a subset of the retained group;
compare the feature of the second group to the feature of the retained group;
determine a metric based on the feature of the second group to the feature of the retained group; and
replace the retained group with the second group if the metric is greater than a specified threshold.

11. The system of claim 10, wherein replacing the retained group with the second group if the metric is greater than the specified threshold includes scaling the metric by a ratio of a size of the second group to the size of the retained group and replacing the retained group with the second group if the scaled metric is greater than the specified threshold.

12. The system of claim 11, wherein replacing the retained group with the second group if the metric is greater than the specified threshold includes multiplying a ratio of the feature of the second to the feature of the retained by a root of the ratio of the size of the second group to the size of the retained group.

13. The system of claim 8, wherein the feature includes one or more of group size, Z range, average vegetation index, percentage of non-void pixels, average Z gradient, average edge Z difference, convexity, average Z phase match, average intensity image edge gradient, average intensity image phase match, and ratio of edge pixels to the size of the group.

14. The system of claim 8, wherein the processing circuitry is further configured to:
receive a 3D point set of a geographical region;
project the 3D point set to an ortho-rectified space of the 3D point set;
generate one or more of a Z image, a vegetation index image, an intensity image, and a void mask image in the ortho-rectified space of the 3D point set; and
wherein the feature of the group is determined based on the generated image.

15. At least one non-transitory machine-readable medium including instructions that, when executed by a machine, cause the machine to perform operations for building mask generation, the operations comprising:
setting a respective pixel value of an image to a first specified value if the respective pixel corresponds, according to a three-dimensional (3D) point set, to an elevation greater than a specified Z threshold, otherwise setting the respective pixel value to a second, different specified value;
grouping contiguous pixels set to the first specified value into one or more groups;
determining a feature of each of the one or more groups;
comparing the determined feature to a threshold and retaining the group if the feature is greater than a threshold, otherwise removing the group; and
providing a building mask that includes pixels of the retained group set to a value and other pixels set to a different value.

16. The at least one non-transitory machine-readable medium of claim 15, wherein the operations further comprise, before providing the building mask:
retaining a first group of the groups;
increasing the specified Z threshold; and
setting a respective pixel value of a next image to the first specified value if the respective pixel corresponds, according to the 3D point set, to an elevation greater than the increased specified Z threshold, otherwise setting the respective pixel value to the second, different specified value.

17. The at least one non-transitory machine-readable medium of claim 16, wherein the operations further comprise:
grouping contiguous pixels of the next image set to the first specified value into one or more second groups;
determining the feature of a second group of the second groups that corresponds to a subset of the retained group;
comparing the feature of the second group to the feature of the retained group;
determining a metric based on the feature of the second group to the feature of the retained group; and
replacing the retained group with the second group if the metric is greater than a specified threshold.

18. The at least one non-transitory machine-readable medium of claim 17, wherein replacing the retained group with the second group if the metric is greater than the specified threshold includes scaling the metric by a ratio of a size of the second group to the size of the retained group and replacing the retained group with the second group if the scaled metric is greater than the specified threshold.

19. The at least one non-transitory machine-readable medium of claim 18, wherein replacing the retained group with the second group if the metric is greater than the specified threshold includes multiplying a ratio of the feature of the second to the feature of the retained by a root of the ratio of the size of the second group to the size of the retained group.

20. The at least one non-transitory machine-readable medium of claim 15, wherein the feature includes one or more of group size, Z range, average vegetation index, percentage of non-void pixels, average Z gradient, average edge Z difference, convexity, average Z phase match, average intensity image edge gradient, average intensity image phase match, and ratio of edge pixels to the size of the group.

* * * * *